Patented July 7, 1931

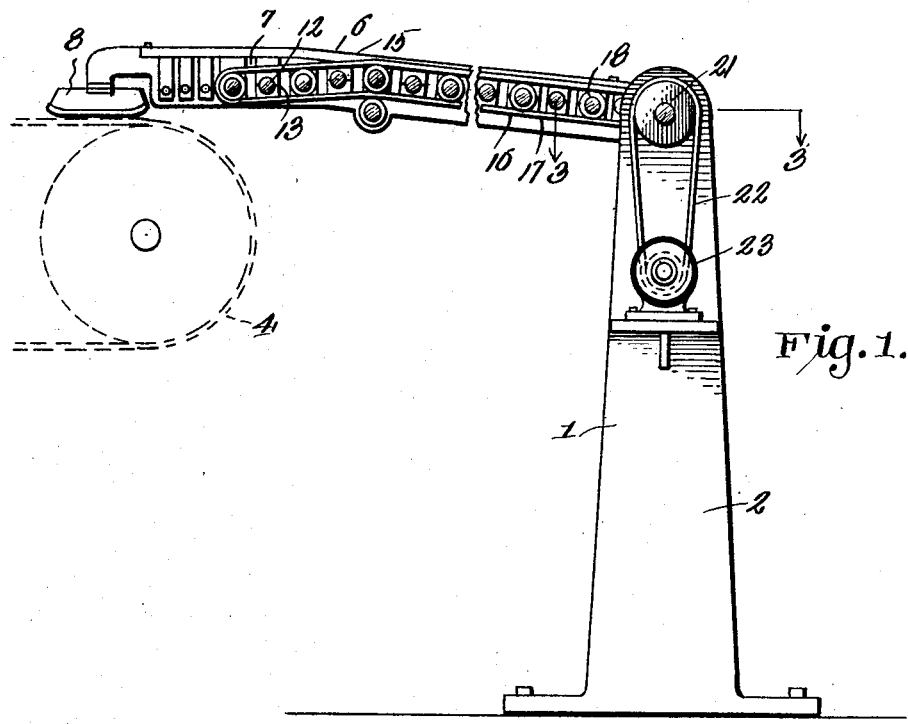

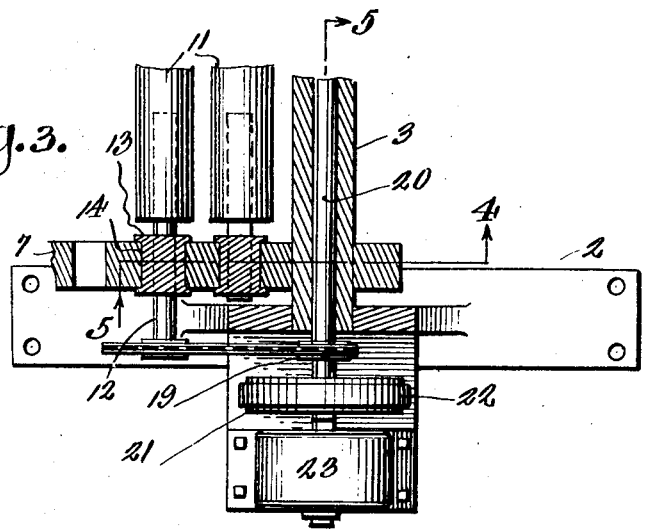
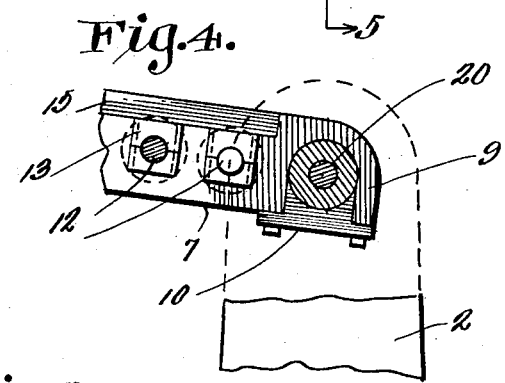
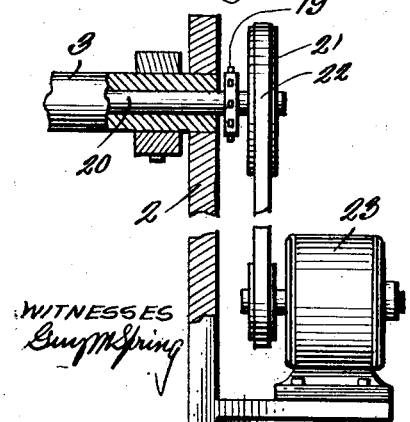
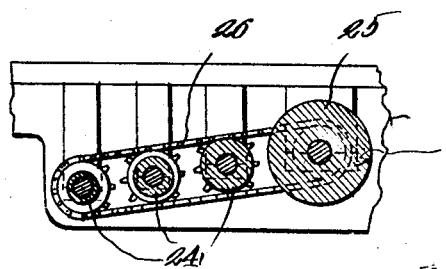

1,812,976

UNITED STATES PATENT OFFICE

FRANK P. NISTLE, OF WEST LAWN, PENNSYLVANIA

CONVEYING APPARATUS

Application filed October 19, 1927. Serial No. 227,312.

This invention relates to conveying apparatuses and has for its primary object the construction of a device whereby articles may be more effectively fed toward and delivered either into a cooking oven or onto a second conveying apparatus in a manner that the articles will not be subject to distorting actions accomplished by continuously and uniformly feeding the articles in the required direction and then gradually lowering the same on to the receiving apparatus.

An object of the invention is the construction of an apparatus in which the component parts are so designed and associated that dough shapes can be properly fed in various directions and delivered in a manner that the configuration of the articles will not be interfered with in any manner whatsoever.

Another object of the invention is the novel manner of constructing the conveying platform so that the feed rolls and delivery rolls are arranged in a fixed relative position and driven at uniform speed so as to assure the proper progressive movement of the articles in the required direction.

A feature of the invention is the novel manner of constructing the conveyor platform so as to have a swinging detachable connection with the stationary support, which enables the platform to properly cooperate with the receiving apparatus but capable of ready removal when occasion arises.

Besides the above my invention is distinguished in the use of feed rolls of uniform diameters and delivery rolls progressively decreasing in diameter to properly discharge the articles on to a receiving apparatus, a novel form of drive mechanism being utilized to assure the uniform rotation of all of the rolls.

With these and other objects in view the invention will be better understood from the following detailed description taken in connection with the accompanying drawings, wherein:

Figure 1 is a side elevation of the apparatus,

Figure 2 is a top plan view,

Figure 3 is a detailed horizontal sectional view on the line 3—3 of Figure 1,

Figure 4 is a sectional view on the line 4—4 of Figure 3,

Figure 5 is a sectional view on the line 5—5 of Figure 3, and

Figure 6 is a detailed sectional view through a slight modification of the invention.

Again referring to the drawings illustrating one of the many constructions of my invention the numeral 1 designates a support illustrated as a pair of standards 2 arranged in spaced relation and rigidly connected together by the sleeve 3. These standards may be directly bolted to the floor to assume a stationary position relative to a receiving device or apparatus illustrated as a belt conveyor 4 of the type usually installed with a baking oven or used to change the direction of travel of articles being conveyed.

The conveying platform designated in its entirety by the numeral 5 may be of any suitable construction but preferably designed to have a swinging connection with the support so as to be capable of movement in a vertical plane to accommodate the proper application of the platform to the receiving apparatus and to allow the same to conform to irregularities in travel of the conveyor 4. As illustrated, the conveyor platform 5 consists of a frame 6 incorporating the side plates 7 that have certain ends fixed to bearing shoes 8 that are associated with the conveyor 4. The remaining ends of the side plates are provided with bearings 9 engaging the sleeve 3 and locked in place by the lock plates 10. Thus it will be appreciated that the same is capable of swinging movements and may be very readily disconnected from the stationary support by disconnecting the lock plates 10 to allow the free removal of the bearings 9 from the sleeve 3. Associated with the side plates are a plurality of feed rolls 11 each of which includes stub shafts 12 mounted in bearing blocks 13 removably mounted in grooves 14 in the side plates and effectively held in place by the clamp plate 15. It will now be appreciated that the feed rolls have a fixed relative position for individual rotation and may be individually removed. Associated with the feed rolls are the delivery rolls 14 of a diameter less than the feed rolls to allow the gradual delivery of the articles from the feed rolls on to the receiving apparatus or conveyor 4 as illustrated in the drawings. These delivery rolls 14 are also mounted for individual movements and individual removal and have individual drive connections 15 with the feed rolls of a character to assure a speed of travel of the auxiliary rolls identical with that of the feed rolls.

To assure the uniform rotation of the feed rolls, I have provided the drive mechanism 16 including the drive chain 17 that passes around sprocket wheels 18 mounted upon the stub shafts of the feed rolls. The drive chains are operated by the drive sprocket 19 mounted on the drive shaft 20 journaled in the sleeve 3 and receiving its power by the drive gear 21 through a drive connection 22 with the motor 23, preferably carried by one of the standards.

In Figure 6 I have shown the delivery rolls 24 progressively decreasing in diameter toward the delivery end of the conveyor platform so as to gradually lower the conveyed articles on to the receiving apparatus. Thus it will be appreciated that articles passing from the feed rolls 25 will be received by the delivery rolls and gradually lowered so as to be effectively and properly deposited upon the receiving apparatus, and as these delivery rolls are driven at a uniform speed with the feed rolls by means of the drive connections 26, it will be understood that the conveyed articles will have a uniform speed of travel and when reaching the delivery end will be simultaneously conveyed forwardly and downwardly before being properly deposited upon the receiving apparatus.

From the foregoing description taken in connection with the accompanying drawings, it will be appreciated that I have designed a conveying apparatus of a unique construction in which the component parts are so constructed and arranged that articles, preferably dough shaped, can be properly and effectively conveyed at a uniform speed toward the receiving apparatus and in such a manner that their shapes will not be distorted in any manner whatsoever. This desired result is accomplished by providing a plurality of feed rolls of uniform diameter uniformly rotated and properly associated with delivery rolls uniformly rotated at the same speed as the feed rolls but of a decreased diameter so as to not only continue the travel of the articles, but lower the same onto the receiving apparatus. It will be appreciated that the apparatus consists primarily of two structures, a supporting structure and a conveying structure, connected together in a novel manner so that the conveying structure may have the proper movements and capable of detachable connection with the supporting structure to facilitate installation or removal of the conveying structure for replacement or a renewal of parts. I wish to call particular attention to the novel manner of arranging the delivery rolls contiguous to the bearing shoes 8 so that the delivery rolls will always assume the proper position relative to the traveling surface of the conveyor 4, to facilitate the passage of the articles from the delivery rolls on to the conveyor.

It is, of course, to be understood that the various rolls may be driven in various other manners than illustrated and may be connected with the stationary support in various ways to have the proper vertical movements as a group and therefore, I do not desire to be limited in protection in any manner whatsoever, except as set forth in the following claims.

What I claim is:

1. A conveying apparatus comprising a pair of standards, a sleeve connecting the standards together, a frame having a detachable and swinging connection with said sleeve, a plurality of feed rolls journaled in said frame and drive mechanism for said rolls including a drive shaft journaled in said sleeve.

2. A conveying apparatus comprising a pair of standards, a horizontally disposed sleeve connecting the standards together, a drive shaft rotatably mounted in said sleeve, a frame having bearings mounted on said sleeve, bearing plates for locking the frame to the sleeve, a plurality of feed rolls journaled in said frame, a direct drive connection between said shaft and said rolls and power means for rotating said shaft.

3. An apparatus of the character described, the combination of a frame, a plurality of feed rolls individually journaled in said frame for individual removal, a plurality of delivery rolls of a decreased diameter and individually mounted in the frame for individual removal, a main drive for the feed rolls and individual drive connections between the delivery rolls and the feed rolls.

4. A conveying apparatus comprising a supporting structure, a drive shaft carried thereby, drive means directly mounted on the supporting structure and having connection with said shaft, a conveying frame having one end mounted to swing about said shaft as an axis and shoes mounted upon the other end of the frame adapted to have direct movable contact with a conveyor.

In testimony whereof I affix my signature.

FRANK P. NISTLE.